United States Patent
Kshirsagar et al.

(10) Patent No.: US 9,550,570 B2
(45) Date of Patent: Jan. 24, 2017

(54) ON-BOARD GENERATION OF OXYGEN FOR AIRCRAFT PASSENGERS

(75) Inventors: Girish S. Kshirsagar, Overland Park, KS (US); Detlev Degenhardt, Stockelsdorf (DE); Ashraf Sherif, Overland Park, KS (US)

(73) Assignee: B/E Aerospace, Inc., Wellington, FL (US)

(*) Notice: Subject to any disclaimer, the term of this patent is extended or adjusted under 35 U.S.C. 154(b) by 568 days.

(21) Appl. No.: 13/481,057

(22) Filed: May 25, 2012

(65) Prior Publication Data

US 2013/0312743 A1    Nov. 28, 2013

(51) Int. Cl.
   A62B 7/14      (2006.01)
   A62B 18/02     (2006.01)
   (Continued)

(52) U.S. Cl.
   CPC .......... *B64D 11/00* (2013.01); *A62B 7/14* (2013.01); *B64D 13/02* (2013.01); *A62B 7/04* (2013.01);
   (Continued)

(58) Field of Classification Search
   CPC .... A62B 7/14; A62B 21/00; B64D 2013/0677
   (Continued)

(56) References Cited

U.S. PATENT DOCUMENTS 3,536,456 A * 10/1970 Bovard .............. A62B 21/00
                                         128/202.26
3,981,300 A *  9/1976 Williams ............. A62B 7/14
                                         128/202.26
(Continued)

FOREIGN PATENT DOCUMENTS

EP    1106245 A2   6/2001
EP    1108458 A1   6/2001
(Continued)

OTHER PUBLICATIONS

EPO, International Search Report and Written Opinion from International Application PCT/US2013/041710 dated Sep. 30, 2013.
(Continued)

*Primary Examiner* — Tan-Uyen (Jackie) T Ho
*Assistant Examiner* — Joseph D Boecker
(74) *Attorney, Agent, or Firm* — Shumaker, Loop & Kendrick, LLP (57) ABSTRACT

The present invention provides a system and method for supplying, generating, conserving, and managing oxygen that is ideally suited for use on-board an aircraft for supply of breathable oxygen to passengers and flight crew. The system includes several components that together optimize oxygen utilization while reducing costs from maintenance and added weight of traditional pressurized gaseous cylinders. Components of the system include a pressurized cylinder of oxygen enriched gas or a chemical oxygen generator for rapid use in emergency situations, an on-board oxygen generator (OBOG) of the ceramic oxygen generator (COG) type incorporating solid electrolyte oxygen separation (SEOS) technology, a controller, a pulsed oxygen supplier, a crew/passenger breathing mask, and one or more sensors including sensors that detect inhale/exhale phases and communicate with the controller so that flow of oxygen may be regulated for conservation and to adapt to physiological needs.

9 Claims, 4 Drawing Sheets

(51) Int. Cl.
*A62B 7/00* (2006.01)
*A62B 7/08* (2006.01)
*B64D 11/00* (2006.01)
*B64D 13/02* (2006.01)
*A62B 7/04* (2006.01)
*A62B 18/00* (2006.01)
*B64D 13/06* (2006.01)

(52) U.S. Cl.
CPC ........ *A62B 18/00* (2013.01); *B64D 2013/0677* (2013.01); *B64D 2231/02* (2013.01); *Y02T 50/44* (2013.01); *Y02T 50/46* (2013.01)

(58) Field of Classification Search
USPC .................. 128/202.26, 204.18, 204.21
See application file for complete search history.

(56) References Cited

U.S. PATENT DOCUMENTS

| | | | |
|---|---|---|---|
| 4,474,175 A * | 10/1984 | Hudimac, Jr. .... | A61M 16/0051 116/70 |
| 4,681,602 A | 7/1987 | Glenn et al. | |
| 4,832,014 A * | 5/1989 | Perkins ................. | A61M 16/00 128/203.12 |
| 4,891,189 A | 1/1990 | Harwood | |
| 5,131,225 A | 7/1992 | Roettger | |
| 5,169,415 A | 12/1992 | Roettger et al. | |
| 5,185,014 A | 2/1993 | Prasad | |
| 5,299,568 A | 4/1994 | Forare et al. | |
| 5,338,516 A | 8/1994 | Zhang et al. | |
| 5,343,859 A | 9/1994 | Kikut | |
| 5,383,449 A | 1/1995 | Forare et al. | |
| 5,390,666 A | 2/1995 | Kimm et al. | |
| 5,438,980 A | 8/1995 | Phillips | |
| 5,660,171 A | 8/1997 | Kimm et al. | |
| 5,709,732 A | 1/1998 | Prasad | |
| 5,711,787 A | 1/1998 | Neill et al. | |
| 5,783,105 A * | 7/1998 | Zhang ................. | C01B 13/0211 252/187.1 |
| 5,881,717 A | 3/1999 | Isaza et al. | |
| 6,033,457 A | 3/2000 | Lawless et al. | |
| 6,041,777 A * | 3/2000 | Faithfull ........... | A61M 16/0054 128/200.24 |
| 6,089,230 A | 7/2000 | Barker et al. | |
| 6,290,759 B1 | 9/2001 | Fenner et al. | |
| 6,319,305 B1 | 11/2001 | Phillips et al. | |
| 6,352,624 B1 * | 3/2002 | Crome et al. ................. | 204/277 |
| 6,491,739 B1 | 12/2002 | Crome et al. | |
| 6,604,558 B2 | 8/2003 | Sauer | |
| 6,726,558 B1 | 4/2004 | Meirav | |
| 6,729,359 B2 | 5/2004 | Jones | |
| 6,739,359 B2 | 5/2004 | Jones et al. | |
| 6,866,701 B2 | 3/2005 | Meirav | |
| 6,866,794 B1 | 3/2005 | Zhang | |
| 6,955,710 B2 | 10/2005 | Lessi et al. | |
| 6,989,044 B2 | 1/2006 | Zhang et al. | |
| 6,997,970 B2 * | 2/2006 | Crome ..................... | A62B 7/14 95/130 |
| 7,048,231 B2 | 5/2006 | Jones | |
| 7,081,153 B2 | 7/2006 | Leigh et al. | |
| 7,087,804 B2 | 8/2006 | O'Rear | |
| 7,144,445 B2 * | 12/2006 | Gueret ................... | B01D 53/02 95/106 |
| 7,152,635 B2 | 12/2006 | Moravec et al. | |
| 7,172,156 B1 | 2/2007 | Jones | |
| 7,172,157 B2 | 2/2007 | Jones | |
| 7,204,868 B2 | 4/2007 | Snow, Jr. | |
| 7,231,162 B2 | 6/2007 | Brenner et al. | |
| 7,273,507 B2 | 9/2007 | Schwalm | |
| 7,306,644 B2 | 12/2007 | Leigh et al. | |
| 7,374,601 B2 | 5/2008 | Bonchonsky et al. | |
| 7,442,230 B2 | 10/2008 | Snow, Jr. | |
| 7,442,238 B2 | 10/2008 | Rittner et al. | |
| 7,445,660 B2 | 11/2008 | Hart et al. | |
| 7,481,214 B2 | 1/2009 | Eilers | |
| 7,509,968 B2 | 3/2009 | Surawski | |
| 7,517,388 B2 | 4/2009 | Jensvold | |
| 7,592,284 B2 | 9/2009 | Zaki et al. | |
| 7,608,131 B2 | 10/2009 | Jensen | |
| 7,625,434 B2 | 12/2009 | Tom et al. | |
| 7,645,324 B2 | 1/2010 | Rode et al. | |
| 7,694,674 B2 * | 4/2010 | Crome ................... | A62B 21/00 128/202.26 |
| 7,717,983 B2 | 5/2010 | Semmere et al. | |
| 2002/0088504 A1 | 7/2002 | Sauer | |
| 2002/0139370 A1 * | 10/2002 | Bachinski .............. | B64D 10/00 128/205.25 |
| 2003/0084900 A1 * | 5/2003 | Leclerc ............. | A61M 16/0057 128/204.18 |
| 2003/0084901 A1 * | 5/2003 | Martinez .................. | A62B 7/14 128/204.26 |
| 2003/0145726 A1 | 8/2003 | Gueret et al. | |
| 2003/0205132 A1 | 11/2003 | Lessi et al. | |
| 2003/0233936 A1 | 12/2003 | Crome | |
| 2004/0000353 A1 | 1/2004 | Jones | |
| 2004/0065778 A1 | 4/2004 | Jones | |
| 2004/0112211 A1 | 6/2004 | Meirav | |
| 2004/0151639 A1 | 8/2004 | Jones et al. | |
| 2004/0163826 A1 * | 8/2004 | Spring ..................... | A62C 3/06 169/46 |
| 2004/0245390 A1 * | 12/2004 | Meckes .................... | A62B 7/14 244/118.5 |
| 2004/0259961 A1 | 12/2004 | O'Rear | |
| 2005/0092177 A1 | 5/2005 | Bonchonsky et al. | |
| 2005/0115404 A1 | 6/2005 | Leigh et al. | |
| 2005/0160909 A1 | 7/2005 | Meirav | |
| 2005/0173017 A1 | 8/2005 | Moravec et al. | |
| 2005/0247197 A1 * | 11/2005 | Snow ....................... | A62C 3/06 95/138 |
| 2005/0263005 A1 | 12/2005 | Rittner et al. | |
| 2006/0011063 A1 | 1/2006 | Zhou | |
| 2006/0021652 A1 | 2/2006 | Surawski | |
| 2006/0117950 A1 * | 6/2006 | Lessi .................... | B01D 53/047 95/96 |
| 2006/0117956 A1 | 6/2006 | Schwalm | |
| 2006/0151669 A1 | 7/2006 | Jones | |
| 2006/0169142 A1 | 8/2006 | Rode et al. | |
| 2006/0243133 A1 | 11/2006 | Hart et al. | |
| 2006/0243184 A1 | 11/2006 | O'Rear | |
| 2006/0243859 A1 | 11/2006 | Lessi et al. | |
| 2006/0243950 A1 | 11/2006 | O'Rear | |
| 2007/0000380 A1 | 1/2007 | Leigh et al. | |
| 2007/0023577 A1 | 2/2007 | Jones | |
| 2007/0054610 A1 | 3/2007 | Jensen | |
| 2007/0062371 A1 | 3/2007 | Eilers | |
| 2007/0107729 A1 * | 5/2007 | Aubonnet .............. | A62B 9/022 128/204.25 |
| 2007/0144347 A1 | 6/2007 | Snow | |
| 2007/0157803 A1 | 7/2007 | McNeil et al. | |
| 2007/0209509 A1 | 9/2007 | Zaki et al. | |
| 2007/0261554 A1 | 11/2007 | Jensvold | |
| 2008/0060523 A1 | 3/2008 | Tom et al. | |
| 2009/0071340 A1 | 3/2009 | Surawski | |
| 2009/0205661 A1 * | 8/2009 | Stephenson ....... | A61M 16/0051 128/204.21 |
| 2009/0320836 A1 * | 12/2009 | Baker, Jr. .............. | A61M 16/12 128/203.14 |
| 2010/0024649 A1 | 2/2010 | Semmere et al. | |
| 2010/0064886 A1 | 3/2010 | Surawski et al. | |
| 2010/0139658 A1 * | 6/2010 | Wenzel .................... | A62B 7/14 128/204.22 |
| 2012/0055475 A1 * | 3/2012 | Wilkinson .......... | A61M 16/101 128/204.21 |
| 2013/0042870 A1 * | 2/2013 | Peacey .................... | A62B 7/14 128/205.12 |
| 2013/0184602 A1 * | 7/2013 | Brambilla ......... | A61M 16/0875 600/543 |
| 2013/0306073 A1 * | 11/2013 | Fromage ................. | A62B 7/14 128/204.22 |

(56) References Cited

U.S. PATENT DOCUMENTS

2014/0345609 A1* 11/2014 Whitcher ............ C01B 13/0259
128/202.26

FOREIGN PATENT DOCUMENTS

| EP | 1338324 | A2 | 8/2003 |
|---|---|---|---|
| EP | 1358911 | A1 | 11/2003 |
| EP | 1375349 | A1 | 6/2005 |
| EP | 1669290 | A1 | 6/2006 |
| EP | 1737729 | A2 | 1/2007 |
| EP | 1839726 | A1 | 10/2007 |
| EP | 1857166 | A1 | 11/2007 |
| EP | 2092962 | A1 | 8/2009 |
| EP | 2163476 | A2 | 3/2010 |
| GB | 2255509 | A | 11/1992 |
| WO | 9707053 | A1 | 2/1997 |
| WO | 03068317 | A1 | 8/2003 |
| WO | 2004002826 | A1 | 1/2004 |
| WO | 2004033601 | A2 | 4/2004 |
| WO | 2004113472 | A2 | 12/2004 |
| WO | 2005002966 | A1 | 1/2005 |
| WO | 2005002968 | A1 | 1/2005 |
| WO | 2005063362 | A1 | 7/2005 |
| WO | 2005115123 | A2 | 12/2005 |
| WO | 2005118073 | A2 | 12/2005 |
| WO | 2006020286 | A2 | 2/2006 |
| WO | 2006074343 | A2 | 7/2006 |
| WO | 2006079782 | A2 | 8/2006 |
| WO | 2006116125 | A2 | 11/2006 |
| WO | 2008097569 | A1 | 8/2008 |
| WO | 2008138930 | A2 | 11/2008 |
| WO | 2009106936 | A2 | 9/2009 |

OTHER PUBLICATIONS

EPO, International Search Report and Written Opinion from International Application PCT/US2013/041245 dated Dec. 4, 2013.
Honeywell, On-Board Inert Gas Generation System (OBIGGS), website, Sep. 13, 2011, 1 page.
Honeywell, On-Board Inert Oxygen Generating System (OBOGS), website, Sep. 13, 2011, 1 page.
EPO, International Search Report in International Patent No. PCT/US2013/041674 dated Oct. 22, 2013.

* cited by examiner

ON-BOARD GENERATION OF OXYGEN FOR AIRCRAFT PASSENGERS

BACKGROUND

This invention generally relates to a system and method for providing regulated flow of oxygen, including for flight crew or passengers on-board an aircraft. The invention more particularly relates to a system and method for ensuring that oxygen gas suitable for breathing is promptly and intermittently available to flight crew or passengers on-board an aircraft including during an aircraft's descent. Components of the system include oxygen generators.

Conventional systems and methods for supplying oxygen to aircraft passengers typically rely upon gaseous oxygen that is either chemically generated in a passenger service unit (PSU) located above a passenger seat or dispensed from pressurized gaseous cylinders. According to the latter, gaseous oxygen may be dispensed through a centralized distribution network on the aircraft or from a plurality of separate individualized gaseous cylinders.

Pressure and flow regulator devices may also be incorporated in systems that provide oxygen and oxygen enriched gas may be delivered to these devices before being passed along to breathing masks of passengers. To assist with flow regulation, pressure sensors may be provided in the inspiratory and expiratory airways of the tubing of such oxygen providing systems. One known method for regulating oxygen involves determining an onset of an exhalation phase of the breath cycle, suspending gas flow delivery to a tubing system during the exhalation phase of the breath cycle, and monitoring exhalation flow and pressure in the tubing system during a plurality of control intervals of the exhalation phase of the breath cycle.

Presently, in passenger oxygen systems of large aircraft utilizing a gaseous oxygen supply source, oxygen is typically distributed from a centrally located bank of storage vessels or cylinders by a network of piping to manifolds that are commonly located adjacent to each row of seats. Each passenger mask is typically supplied via a separate orifice of the manifold. By varying the input pressure to the manifolds, the flow of oxygen to each of the masks can be varied.

When the emergency oxygen is to be supplied to a face mask, a constant flow of oxygen is typically received by a reservoir bag attached to the face mask. The oxygen is commonly supplied continuously at a rate that is calculated to accommodate even the needs of a passenger with a significantly larger than average tidal volume who is breathing at a faster than average respiration rate. The continuing flow of oxygen into the reservoir bag and into the mask is typically diluted by cabin air.

Chemically generated oxygen systems are generally suitable for shorter duration flights, under 22 minutes. However, the terrain of the flight path is also a determining factor in the suitability of chemically generated oxygen systems to meet oxygen demands. In addition to these limitations, chemically generated oxygen systems are provided as single use devices that once activated can only be used once and must be replaced for future use. One conventional system for supplying oxygen to an aircraft cabin is known that includes a plurality of chemical oxygen generators with igniters, sequencers for energizing the igniters in sequence, and oxygen masks to which the chemical generators distribute the oxygen generated. A pressure sensor in part of the distribution system controls the sequencers to energize the igniter of the next chemical generator in sequence whenever the pressure drops below a threshold.

For longer duration flights and flights subject to variable or challenging terrain gaseous oxygen is required. Gaseous oxygen is stored in cylinders that add significant weight, increasing fuel costs, and contribute to the hazard potential of the oxygen supply system.

There are disadvantages to relying entirely on either a pressurized cylinder of oxygen enriched gas or a chemical oxygen generator. Pressurized cylinders of oxygen enriched gas add significant weight to an oxygen supply system and contribute to its hazard potential by providing an ever-present risk of combustion. Added weight increases fuel costs. Oxygen from pressurized cylinders of gas may be distributed from one or more sources within a distribution network of an aircraft or individual cylinders may be provided for each passenger or crew member. In either case, given the limited space of an aircraft, oxygen from the cylinders is typically not far from components of the aircraft's illumination system increasing the hazard potential. For example, individual cylinders or outlets of a distribution network above the seats are near the lights.

Chemical oxygen generators decrease this hazard potential and reduce the weight of continuously storing pressurized gaseous cylinders but have limited applications as discussed above. The need to refill pressurized cylinders and to replace single use chemical oxygen generators increases the maintenance costs for aircraft oxygen supply systems.

Enhancing the efficiency of such aircraft emergency oxygen supply systems either in terms of the generation, storage, distribution or consumption of oxygen could therefore yield a weight savings. Conversely, an enhancement of an aircraft emergency oxygen supply system's efficiency without a commensurate downsizing would impart a larger margin of safety in the system's operation. It is therefore highly desirable to enhance the efficiency of an emergency oxygen supply system in any way possible.

The delivered supplemental oxygen flow rate needed to properly oxygenate an aircraft cabin occupant depends on the prevailing pressure altitude. The quantity of oxygen delivered to a user can advantageously be varied as a function of altitude, so that the quantity delivered produces proper oxygenation, while avoiding an inefficient and wasteful delivery of a greater quantity of oxygen than is required.

In addition to supplying oxygen on-board an aircraft from pre-existing oxygen sources, including pressurized gaseous cylinders and chemical oxygen generators, on-board oxygen generators (OBOG) are known. Two types of on-board oxygen generators (OBOG) include molecular sieve oxygen generators (MSOG) and ceramic oxygen generators (COG).

A molecular sieve oxygen generating (MSOG) system is known that generates a supply of oxygen or an oxygen enriched gas and a residual gas from a supply gas. When the molecular sieve oxygen generator (MSOG) type of on-board oxygen generator (OBOG) devices relying on pressure swing adsorption (PSA) technology are used and operating efficiently they produce an oxygen enriched gas comprising up to 95% oxygen with a residual gas stream that can contain greater than about 9% oxygen. However, this system has limited applicability for meeting aircraft passenger demands for oxygen in the initial stages of operation. Further, this system does not minimize consumption of oxygen or conserve oxygen.

Pressure swing adsorption (PSA) technology, incorporated in molecular sieve oxygen generating (MSOG) systems, is based on the principle that gases under pressure are generally attracted to solid surfaces upon which the gases are adsorbed. Higher pressure results in greater gas adsorption. When the pressure is reduced or swings from high to low, gas is released or desorbed. Gaseous mixtures may be separated through pressure swing adsorption (PSA) because different gases tend to be adsorbed or attracted to different solid materials to varying degrees.

Accordingly, when the pressure is reduced gases that are less strongly attracted to the solid materials will be desorbed first to form an outlet stream. After the bed of solid material to which gases are adsorbed reaches its capacity to adsorb, pressure is further reduced to release even the more strongly attracted gases. As applied to an on-board oxygen generator (OBOG), engine bleed air is typically fed into the pressure swing adsorption (PSA) device, the nitrogen component of air is adsorbed to a bed of solid material more strongly than the oxygen component of air, and a gaseous outlet stream enriched with oxygen is produced. This is similar to the process used in portable oxygen concentrators for emphysema patients and others who require oxygen enriched air to breathe.

Adsorbents for pressure swing adsorption (PSA) systems must have the ability to discriminate between two or more gases demonstrating selective adsorption. Suitable adsorbent materials for pressure swing adsorption (PSA) systems are usually very porous materials selected for their large surface areas, for example activated carbon, silica gel, alumina and zeolites. The gas adsorbed on these surfaces may consist of a layer that is only one or at most a few molecules thick. Adsorbent materials having surface areas of several hundred square meters per gram enable the adsorption of a significant portion of the adsorbent's weight in gas. The molecular sieve characteristics of zeolites and some types of activated carbon called carbon molecular sieves serve to exclude some gas molecules based on size, in addition to the differential adsorption selectivity for different gases.

Another system is known that utilizes molecular sieve bed and/or permeable membrane technology, to produce first, oxygen for use for breathing by an aircrew, and second, nitrogen for use as an inert environment in the fuel tanks of an aircraft. However such systems still require the provision of compressors for both the oxygen, in order that the oxygen can be delivered at an appropriate pressure for breathing, and for the nitrogen. Also, the concentration of oxygen which can be produced is restricted by virtue of the nature of the conventional on-board oxygen generator (OBOG) device technology which is used. Due to the high temperature requirement there is a time lag before full oxygen capacity can be utilized.

Another type of on-board oxygen generator (OBOG) is a ceramic oxygen generator (COG). Ceramic oxygen generator (COG) devices utilize solid electrolyte oxygen separation (SEOS) technology in which oxygen is catalytically separated from air inside specialized ceramic materials at high temperatures, about 650° C. to 750° C., using electrical voltage. While this process produces substantially pure oxygen gas product at pressure and suitable for breathing at any altitude, including higher altitudes over 30,000 feet, the drawback is that the oxygen is not promptly available upon powering on the device because the device has to reach the required operating temperature first.

Oxygen for breathing generated by on-board oxygen generator (OBOG) devices typically is not promptly available due to the required cycling through membranes. While ceramic oxygen generator (COG) devices typically are superior to molecular sieve oxygen generator (MSOG) devices based on an ability to provide purer or more highly concentrated oxygen-enriched gas at pressure suitable for breathing, oxygen from ceramic oxygen generator (COG) devices is also not promptly available due to the high temperature requirement necessary for oxygen generation from such devices.

When an emergency situation arises on-board an aircraft, oxygen that is promptly available at a concentration, temperature, and pressure suitable for breathing is needed. At high altitudes, greater than 30,000 feet, 99% purity or higher oxygen gas is required. At lower altitudes, equal to or less than 30,000 feet, oxygen gas that is 90-95% oxygen may be suitable. An emergency situation may include sudden cabin decompression, sudden descent, and the like.

It would be desirable to provide a system that leverages the advantages of ceramic oxygen generator (COG) devices incorporating solid electrolyte oxygen separation (SEOS) technology without sacrificing availability of breathable oxygen gas in the short-term during descent or upon an emergency situation arising by integrating ceramic oxygen generator (COG) devices with other sources that provide oxygen in the short-term. Ideally, such a system that integrates on-board oxygen generator (OBOG) devices, including ceramic oxygen generator (COG) devices, with short-term oxygen supplies would also conserve oxygen and maximize efficiency of oxygen usage.

Short-term needs emerge upon an emergency situation arising or during an initial descent mode of an aircraft. Longer-term needs exist during a subsequent holding altitude mode of an aircraft. It would also be desirable to provide a system and method for maximizing efficiency of oxygen usage by reducing reliance on pressurized gaseous cylinders and chemical oxygen generators. There is a need for a system that reserves usage of such bulky cylinders and single-use disposable generators to emergency and descent situations, before oxygen enriched gas from an on-board oxygen generator (OBOG) device is available, to reduce maintenance costs for aircrafts reliant upon pressurized cylinders and chemical oxygen generators.

It would further be desirable to conserve oxygen that is available or generated by providing oxygen to the masks of passengers or crew intermittently, utilizing a feedback mechanism such that oxygen is provided as needed with a margin allowed for safety. The present invention meets these and other needs.

SUMMARY OF THE INVENTION

Briefly, and in general terms, the present invention provides a system and method for promptly and intermittently supplying oxygen enriched gas suitable for breathing. According to one aspect of the present invention, the system is designed to meet the needs of the flight crew and the passengers of an aircraft, including during both emergency and initial descent and holding altitude modes.

According to a first aspect of several aspects, the present invention provides a system for providing regulated flow of oxygen, including for flight crew or passengers on-board an aircraft, the system including a first on-board oxygen supplier configured to supply oxygen in an initial stage, a second on-board oxygen supplier configured to generate oxygen on-board an aircraft in a subsequent stage, and a controller configured to control the first on-board oxygen supplier and the second on-board oxygen supplier. The first on-board oxygen supplier may include a pressurized oxygen cylinder and/or a chemical oxygen generator. The first on-board oxygen supplier is configured to supply highly enriched oxygen at pressure suitable for breathing at high altitudes greater than 30,000 feet. The second on-board oxygen supplier includes a solid electrolyte oxygen separator configured to catalytically separate oxygen from a supply stream of air at a temperature of 650° C. to 750° C. by applying an electrical voltage. The solid electrolyte oxygen separator includes a ceramic material inside of which oxygen is catalytically separated from the supply stream of air.

The system may further include a breathing mask in a communicating relationship with the first on-board oxygen supplier and the second on-board oxygen supplier, whereby the breathing mask is configured to receive oxygen from at least one of the first on-board oxygen supplier and the second on-board oxygen supplier. The system may also include a pulsed oxygen delivery subsystem connected to both the first on-board oxygen supplier and the second on-board oxygen supplier and configured to regulate flow of oxygen to the breathing mask based on a sensed breathing pattern and physiological requirements. The controller is configured to initiate rapid flow of oxygen from the first on-board oxygen supplier at high altitudes greater than 30,000 feet.

According to a second aspect, the present invention provides a system for providing regulated flow of oxygen, including for flight crew or passengers on-board an aircraft, the system including: a first on-board oxygen supplier configured to supply oxygen during an initial stage, a second on-board oxygen supplier configured to generate oxygen on-board an aircraft to be supplied during a subsequent stage, a breathing mask in a communicating relationship with both the first on-board oxygen supplier and the second on-board oxygen supplier, whereby oxygen is supplied to a passenger or a flight crew member through the breathing mask from at least one of the first on-board oxygen supplier and the second on-board oxygen supplier, and a controller electrically connected to both the first on-board oxygen supplier and the second on-board oxygen supplier and configured to control the first on-board oxygen supplier and the second on-board oxygen supplier.

According to a third aspect, the present invention provides a system for providing regulated flow of oxygen, including for flight crew or passengers on-board an aircraft, the system including: a first on-board oxygen supplier configured to supply oxygen during an initial stage, a second on-board oxygen supplier configured to generate oxygen on-board an aircraft to be supplied during a subsequent stage, a controller electrically connected to both the first on-board oxygen supplier and the second on-board oxygen supplier and configured to control the first on-board oxygen supplier and the second on-board oxygen supplier, a pulsed oxygen delivery subsystem connected to both the first on-board oxygen supplier and the second on-board oxygen supplier and downstream of both the first on-board oxygen supplier and the second on-board oxygen supplier, and a breathing mask connected to and downstream of the pulsed oxygen delivery subsystem, wherein the pulsed oxygen delivery subsystem is configured to regulate flow of oxygen to the breathing mask based on a sensed breathing pattern and physiological requirements of a passenger or a flight crew member.

According to a fourth aspect, the present invention provides a method for providing regulated flow of oxygen, including for flight crew or passengers on-board an aircraft, the method including: activating a first system to initiate rapid flow of oxygen from a first on-board oxygen supplier at high altitudes greater than 30,000 feet, powering on a second system including an on-board oxygen generator, activating the second system to initiate flow of oxygen from the on-board oxygen generator, integrating oxygen supplied from the second system with oxygen supplied from the first system, deactivating the first system when the second system is able to meet oxygen demands, sensing a breathing pattern of a passenger or a flight crew member; and regulating flow of oxygen to a breathing mask of a passenger or a flight crew member by delivering oxygen to the mask from the first system or the second system through a pulsed oxygen supplier configured to vary a flow rate of oxygen based on a sensed breathing pattern and physiological requirements. In accordance with the method, the first on-board oxygen supplier may include a pressurized oxygen cylinder and/or a chemical oxygen generator. The on-board oxygen generator of the second system is configured to supply highly enriched oxygen at pressure suitable for breathing at high altitudes greater than 30,000 feet and also suitable for breathing at altitudes less than or equal to 30,000 feet.

The system is designed to minimize the weight, volume, and potential combustion risk of the oxygen generators. The system is also designed to conserve usage of oxygen by selectively controlling the supply of oxygen from various sources and the interaction of various components of the system.

The pressurized cylinder of oxygen enriched gas or the chemical oxygen generator may be used to promptly supply oxygen gas at pressure suitable for breathing upon an emergency situation arising or during initial aircraft descent mode.

According to one of several aspects of the invention, the system includes lighter weight on-board oxygen generator (OBOG) devices to supply oxygen as part of the system together with traditional pressurized cylinders or chemical oxygen generators. The amount of oxygen that must be stored in the cylinders or generated by the chemical oxygen generators is reduced to the amount of oxygen necessary to cover the time period from onset of an emergency situation or descent until the secondary supply of oxygen from the on-board oxygen generator (OBOG) device is available.

The system of the invention is designed to decrease maintenance costs by reducing or eliminating the need for refilling of gaseous oxygen in pressurized cylinders on the ground and reducing or eliminating the need for replacing single use chemical oxygen generators. The system of the invention may accomplish these objectives by storing for future use excess high purity oxygen gas produced from on-board oxygen generator (OBOG) devices. Excess highly oxygen enriched gas beyond that required to satisfy the current needs of passengers or crew for breathing may be feed into a pressurized cylinder or other emergency supply reservoir.

The system of the invention detects when a passenger or crew member inhales through their breathing mask and initiates or resumes the flow of oxygen to their mask upon detecting inhalation. The pulsed oxygen delivery subsystem that feeds the breathing masks is designed to adjust the flow rate of oxygen to the masks based on known or sensed physiological requirements of passengers and flight crew as dictated by the aircraft's descent profile.

In addition to the components discussed above, the present invention may also incorporate additional on-board oxygen generator (OBOG) or on-board inert gas generator (OBIGG) devices in any series, combination, or orientation to produce desirable effects including maintenance of an adequately enriched oxygen supply for breathing in the short-term, refilling emergency oxygen supplies, providing sufficient inert gas streams to fill voids in the fuel tank to keep pace with combustion, and the like.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

The present invention provides a system and method for generating, supplying and maintaining adequate reserves of oxygen. One preferred application for the present invention is to provide oxygen for passengers and flight crew on-board an aircraft including at high altitudes above 30,000 feet, during descent, at holding altitudes at or below 30,000 feet, on flight paths over variable terrain, and on flights of any duration. The present invention offers several advantages for providing oxygen to passengers and crew on both business jets and commercial aircrafts.

Maintaining adequate reserves of oxygen may be accomplished by storing excess oxygen generated for future use through refilling emergency reserves. Conservation of available oxygen by more closely matching oxygen supplied from the system to oxygen demand by passengers and crew also assists with maintenance of adequate reserves.

Figure 1:
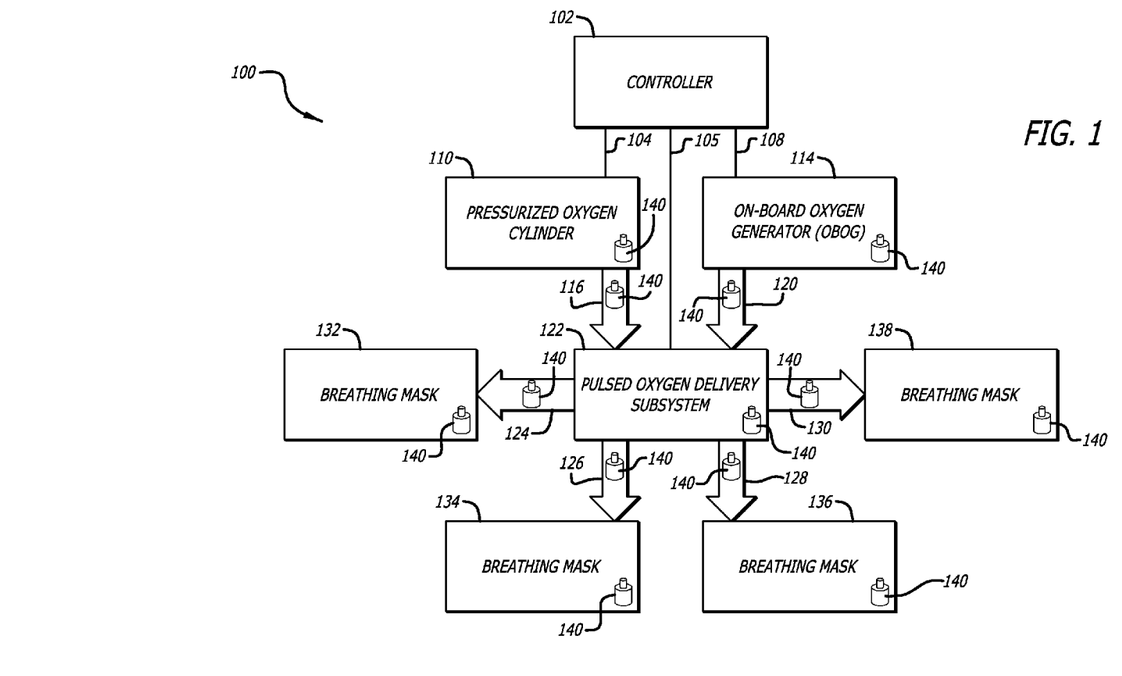
FIG. 1 is a schematic diagram illustrating integration of traditional and contemporary oxygen supply systems through a common controller in accordance with an aspect of the present invention.
Figure 2:
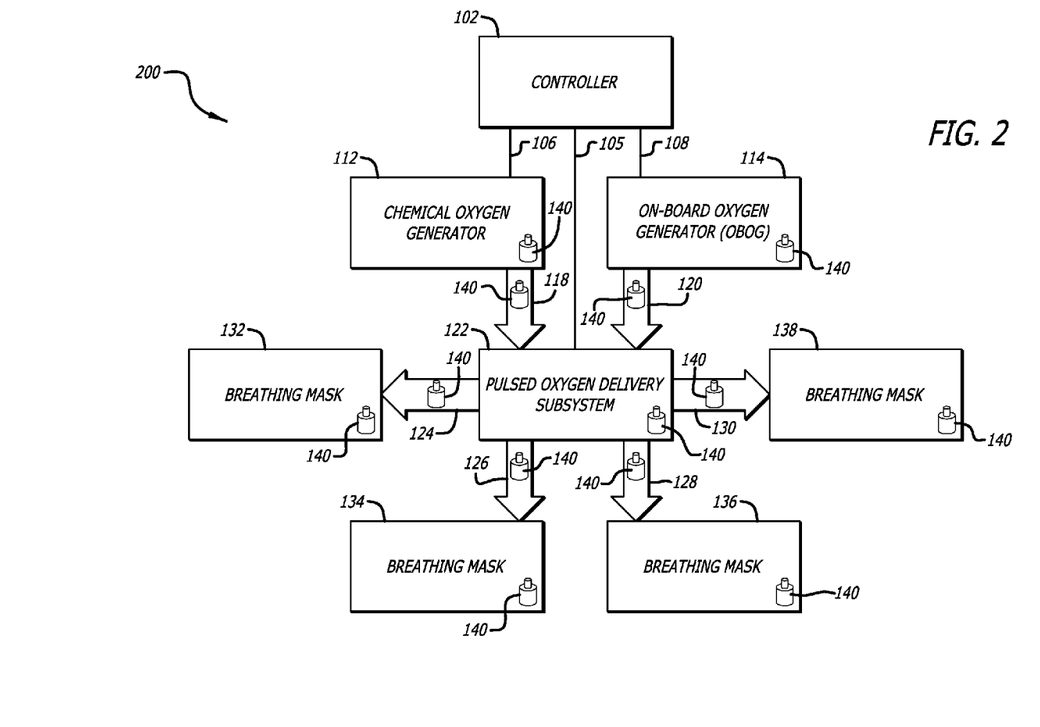
FIG. 2 is a schematic diagram illustrating integration of traditional and contemporary oxygen supply systems through a common controller in accordance with a second aspect of the present invention.
Figure 3:
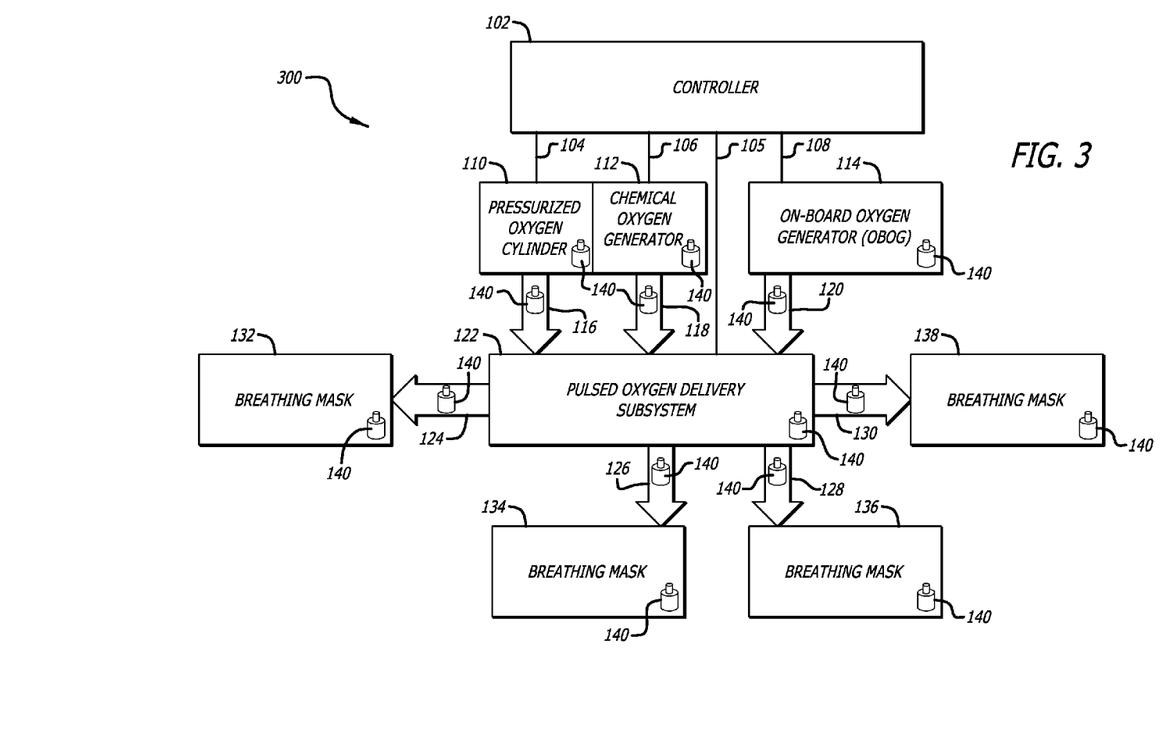
FIG. 3 is a schematic diagram illustrating integration of traditional and contemporary oxygen supply systems through a common controller in accordance with a third aspect of the present invention.

Accordingly, as is shown in FIGS. 1 through 3, which are provided for purposes of illustration by way of example, and not by way of limitation, the present invention provides for a system for providing regulated flow of oxygen rapidly and intermittently as needed, in aircraft. Referring to FIG. 1, in a first presently preferred embodiment, the system 100 for providing regulated flow of oxygen rapidly and intermittently as needed, in aircraft, includes a controller or control system 102 in electronic communication with a pressurized cylinder 110 through line 104. The controller is also in electronic communication with a pulsed oxygen delivery subsystem 122 through line 105. Additionally, the controller is in electronic communication with an on-board oxygen generator 114 through line 108. The pressurized oxygen cylinder is in fluid communication with the pulsed oxygen delivery subsystem through feed line 116. The on-board oxygen generator is also in fluid communication with the pulsed oxygen delivery subsystem through feed line 120. The pulsed oxygen delivery subsystem, in turn, is in fluid communication with one or more breathing masks 132, 134, 136, and 138 which can be provided for passengers and crew members through low pressure tubing 124, 126, 128, and 130. Optionally, one or more sensors 140 or detectors in electronic communication with the controller and/or the pulsed oxygen delivery subsystem may be provided in any of the breathing masks, the pulsed oxygen delivery subsystem, the oxygen sources, or along the feed lines or low pressure tubing through which oxygen is supplied for sensing air pressure and/or flow and communicating a corresponding sensor signal indicating air pressure and/or flow to the controller, as will be further explained below.

With regard to FIGS. 1, 2, and 3, different types of sensors or detectors may be provided for each of the oxygen sources, the feed lines, the pulsed oxygen delivery subsystem, and in the breathing masks. As used herein, reference numeral 140 refers generally and broadly to any type of sensor or detector in any of these locations and need not be the same across the various locations. For example, the sensors or detectors represented by reference numeral 140 may be for measuring pressure, flow rate, temperature, volume, concentration of constituent gases in a gaseous mixture, oxygen usage rates, and the like.

Referring to FIG. 2, in a second presently preferred embodiment, the system 200 for providing regulated flow of oxygen rapidly and intermittently as needed, in aircraft, includes a controller or control system 102 in electronic communication with a chemical oxygen generator 112 through line 106. The controller is also in electronic communication with a pulsed oxygen delivery subsystem 122 through line 105. Additionally, the controller is in electronic communication with an on-board oxygen generator 114 through line 108. The chemical oxygen generator is in fluid communication with the pulsed oxygen delivery subsystem through feed line 118. The on-board oxygen generator is also in fluid communication with the pulsed oxygen delivery subsystem through feed line 120. The pulsed oxygen delivery subsystem, in turn, is in fluid communication with one or more breathing masks 132, 134, 136, and 138 which can be provided for passengers and crew members through low pressure tubing 124, 126, 128, and 130. Optionally, one or more sensors 140 or detectors in electronic communication with the controller and/or the pulsed oxygen delivery subsystem may be provided in any of the breathing masks, the pulsed oxygen delivery subsystem, the oxygen sources, or along the feed lines or low pressure tubing through which oxygen is supplied for sensing air pressure and/or flow and communicating a corresponding sensor signal indicating air pressure and/or flow to the controller, as will be further explained below.

Referring to FIG. 3, in a third presently preferred embodiment, the system 300 for providing regulated flow of oxygen rapidly and intermittently as needed, in aircraft, includes a controller or control system 102 in electronic communication with pressurized cylinder 110 through line 104 and also in electronic communication with a chemical oxygen generator 112 through line 106. The controller is further in electronic communication with a pulsed oxygen delivery subsystem 122 through line 105. Additionally, the controller is in electronic communication with an on-board oxygen generator 114 through line 108. The pressurized oxygen cylinder is in fluid communication with the pulsed oxygen delivery subsystem through feed line 116 and the chemical oxygen generator is in fluid communication with the pulsed oxygen delivery subsystem through feed line 118. The on-board oxygen generator is also in fluid communication with the pulsed oxygen delivery subsystem through feed line 120. The pulsed oxygen delivery subsystem, in turn, is in fluid communication with one or more breathing masks 132, 134, 136, and 138 which can be provided for passengers and crew members through low pressure tubing 124, 126, 128, and 130. Optionally, one or more sensors 140 or detectors in electronic communication with the controller and/or the pulsed oxygen delivery subsystem may be provided in any of the breathing masks, the pulsed oxygen delivery subsystem, the oxygen sources, or along the feed lines or low pressure tubing through which oxygen is supplied for sensing air pressure and/or flow and communicating a corresponding sensor signal indicating air pressure and/or flow to the controller, as will be further explained below.

The chemical oxygen generator 112 may optionally include one or more accompanying igniters or sequencers or a chemical oxygen generator initiation device.

The on-board oxygen generator (OBOG) 114 may include a ceramic oxygen generator (COG) device incorporating solid electrolyte oxygen separation (SEOS) technology.

At least one on-board oxygen generator (OBOG) is preferably of the ceramic oxygen generator (COG) type. The ceramic oxygen generator (COG) type of device provides the advantages of producing highly enriched oxygen gas (substantially 100% $O_2$) at pressure suitable for breathing, thereby reducing or eliminating the need for compressors which take up space and add weight.

Figure 4:
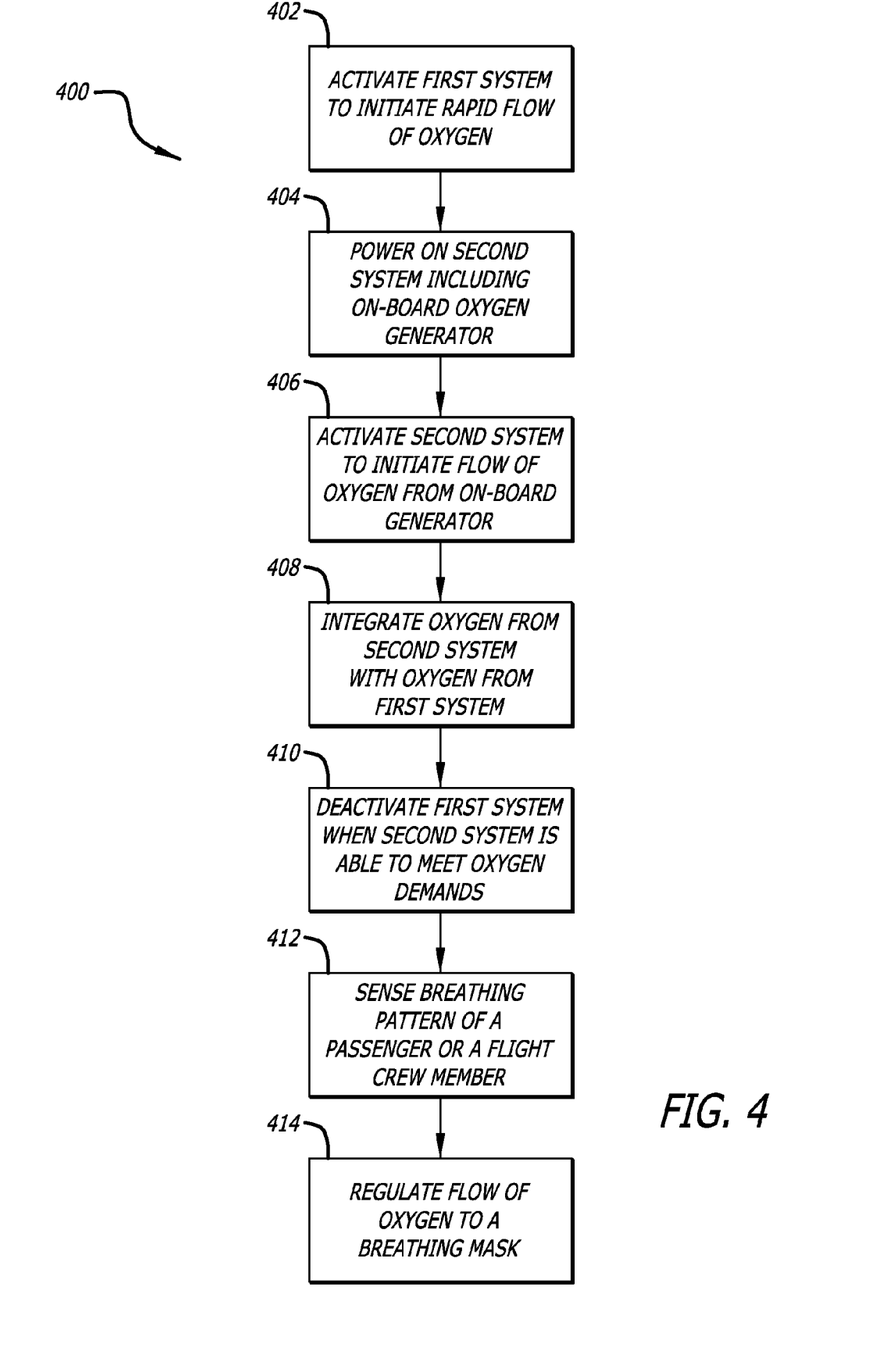
FIG. 4 is a flow chart illustrating a method for providing regulated flow of oxygen on-board an aircraft in accordance with an aspect of the present invention.

Referring to FIG. 4, the steps of a method 400 in accordance with an embodiment of the present invention are illustrated. A method for providing regulated flow of oxygen, including for flight crew or passengers on-board an aircraft, includes the step 402 of activating a first system to initiate rapid flow of oxygen from a first on-board oxygen supplier at high altitudes greater than 30,000 feet. Then, a second system including an on-board oxygen generator is powered on at 404. The second system is activated at 406 to initiate flow of oxygen from the on-board oxygen generator. Then, at 408, oxygen supplied from the second system is integrated with oxygen supplied from the first system. The first system is deactivated when the second system is able to meet oxygen demands, as shown at 410. At 412, the breathing pattern of a passenger or a flight crew member is sensed. At 414, the flow of oxygen to a breathing mask is regulated, for example, by delivering oxygen to the mask from the first system or the second system through a pulsed oxygen subsystem configured to vary a flow rate of oxygen based on a sensed breathing pattern and physiological requirements.

During an initial stage, for example immediately after an emergency situation arises, a stream of gas highly enriched with oxygen is provided from the first on-board oxygen supplier. The initial stage typically exists when the aircraft is at an altitude greater than 30,000 feet. In a subsequent stage, oxygen is supplied from a second on-board oxygen supplier. The second on-board oxygen supplier includes an on-board oxygen generator that produces oxygen enriched gas on-board the aircraft. The subsequent stage typically exists after the aircraft has completed an initial descent and reached a holding altitude.

Ceramic membranes for separating oxygen from a supply stream of air rely on the catalytic properties of the interior surfaces of specialized ceramic materials to ionize and then separate oxygen. As applied on aircrafts the supply stream of air for the ceramic oxygen generator (COG) type on-board oxygen generator (OBOG) device is typically engine bleed air. However, the supply gas for the ceramic oxygen generator (COG) type on-board oxygen generator (OBOG) device may come from other sources. For example, the supply gas may come from the product stream of another on-board oxygen generator (OBOG) device positioned upstream, including a ceramic oxygen generator (COG) or molecular sieve oxygen generator (MSOG).

The oxygen ionization process at high surface temperatures is partly responsible for generation of a product gas from the ceramic membrane systems that is virtually 100% pure oxygen with no possibility for the presence of biological or toxic chemical components. Ceramic operating temperatures are around 700° C. and the electrical potential difference across the membrane is on the order of a volt. Ceramic membrane oxygen generators are one preferred subset of ion transport membrane (ITM) technologies.

The highly enriched oxygen gas produced by the ceramic oxygen generator (COG) device is suitable for breathing at higher altitudes above 30,000 feet whereas more moderately enriched oxygen gas produced by other types of on-board oxygen generator (OBOG) devices, including molecular sieve oxygen generator (MSOG) devices, is not suitable for breathing at higher altitudes and requires compressors to pressurize it before it is suitable for breathing at lower altitudes. Highly enriched oxygen gas from the ceramic oxygen generator (COG) device may be used directly for breathing at any altitude after waiting for attainment of the high temperature requirement necessary to the production of such gas.

The standby availability of the ceramic oxygen generator (COG) device on-board the aircraft reduces reliance on pressurized gas cylinders and chemical oxygen generators. Smaller pressurized gas cylinders may be provided if ceramic oxygen generator (COG) type on-board oxygen generator (OBOG) devices are available. Additionally, the excess oxygen generated by the ceramic oxygen generator (COG) devices might be used to refill the smaller pressurized cylinders in the air, thereby reducing maintenance costs from refilling or replacing pressurized gaseous cylinders on the ground.

By incorporating this ceramic oxygen generator (COG) device and existing solid electrolyte oxygen separation (SEOS) technology as a component in a system with other components that can supply oxygen sooner and managing the supply of oxygen among the components, the present invention overcomes the drawback of delays encountered with ceramic oxygen generator (COG) and solid electrolyte oxygen separation (SEOS) devices. For example, pressurized cylinders of highly oxygen enriched gas (about 99% oxygen and above) or chemical oxygen generators may supply oxygen for about the first 5-10 minutes upon an emergency situation arising. After the first 5-10 minutes it is likely that the aircraft will have descended to or below 30,000 feet at which point a molecular sieve oxygen generator (MSOG) type of on-board oxygen generator (OBOG) can be relied upon to supply more moderately enriched oxygen gas (90-95%) suitable for breathing at lower altitudes. Alternatively, after the first 5-10 minutes if the aircraft has not descended sufficiently to switch the oxygen supply source to the molecular sieve oxygen generator (MSOG), it is likely that by that time the ceramic oxygen generator (COG) type on-board oxygen generator (OBOG) device will be ready to utilize, having attained the necessary temperature requirement and sufficiently cycled.

The controller may be used to coordinate the supply of oxygen from the various sources to the one or more pulsed oxygen suppliers (not shown) of the pulsed oxygen delivery subsystem that feed one or more individual breathing masks. The controller is able to determine what quality of oxygen is required based on altitude and what sources of oxygen are available. The controller manages the oxygen supplies as necessary to meet the demands of passengers and crew while maintaining adequate reserves.

For example, upon an emergency situation arising at high altitude greater than 30,000 feet, if oxygen from a ceramic oxygen generator (COG) device is not promptly available because the ceramic oxygen generator (COG) device was not turned on until the emergency situation arose, the controller can direct a pressurized cylinder or a chemical oxygen generator to promptly supply oxygen. Upon the ceramic oxygen generator (COG) device attaining operation temperature of 650° C. to 750° C. and cycling, the controller can sense the presence of highly enriched oxygen available from the ceramic oxygen generator (COG) device, infiltrate this into the supply stream from the pressurized cylinder or chemical oxygen generator, and phase out supply from the pressurized cylinder or chemical oxygen generator once the ceramic oxygen generator (COG) type on-board oxygen generator (OBOG) device is able to adequately meet demand.

One way in which the system may provide regulated flow of oxygen rapidly and intermittently, as needed in aircraft, is through the pulsed oxygen delivery subsystem, which can conserve oxygen, such as by regulating oxygen flow to the breathing mask of a passenger or a flight crew member during an exhalation phase of the breathing cycle and resuming flow of oxygen to the breathing mask during an inhalation phase.

For example, one or more sensors may be provided in fluid communication with each breathing mask for detecting an inhalation phase or an exhalation phase of a breathing cycle of a passenger or a flight crew member and then communicating this information to the controller. The controller, in turn, directs the pulsed oxygen delivery subsystem and the oxygen sources accordingly to conserve, decrease, stop, increase, or resume the flow of oxygen as needed to better manage oxygen supplies while meeting the demands of passengers and flight crew members.

Other components may be incorporated in different embodiments but are not required. For example, these other components may be a main cabin decompression relay, one or more additional relays, an electrically operated on/off inlet valve between each oxygen source and each of the feed lines from the oxygen source to each breathing mask, one or more pressure transducers, and the like.

Other components of the system may also include cooling or heating devices, for example along the feed lines, to ensure enriched oxygen gas from the oxygen generator (particularly the high temperature ceramic oxygen generator (COG) device is supplied to the breathing masks of passengers or cabin flight crew at the appropriate temperature compatible with physiological preferences or requirements. Cooling or heating devices, for example along the feed lines, may also be provided to ensure inert gas is delivered to the fuel tank at the appropriate temperature.

Additionally, the pulsed oxygen delivery subsystem may include one or more pulsed oxygen suppliers (not shown) for intermittently providing flow of oxygen to the individual breathing masks. The breathing masks may each include a reservoir bag.

In alternative embodiments, as part of the control system, in addition to the controller, one or more sensors 140 or detectors at each of the oxygen sources may be provided to determine volume available and oxygen concentration. Another sensor or detector (not shown) in a communicating relationship with the controller may read altitude. Additional sensors 140 and detectors may be provided within individual breathing masks, within the pulsed oxygen delivery subsystem, or along any of the lines to or from the breathing masks or the pulsed oxygen delivery subsystem to monitor other variables including oxygen usage rates.

In still other embodiments, the controller may be in electrical communication with each oxygen source and a main cabin decompression relay (not shown). More specifically, the controller may be in communication with an electrically operated on/off inlet solenoid valve (not shown) between each oxygen source and each breathing mask, or between each oxygen source and the pulsed oxygen delivery subsystem supplying oxygen to the masks, or between the pulsed oxygen delivery subsystem and each mask.

In further embodiments, given the ability of ceramic oxygen generator (COG) type on-board oxygen generator (OBOG) devices to perform better with input streams more highly concentrated in oxygen, it may be particularly advantageous to have another on-board oxygen generator (OBOG) device upstream of the ceramic oxygen generator (COG) device. This upstream on-board oxygen generator (OBOG) would serve to increase the oxygen concentration in the supply stream fed to the ceramic oxygen generator (COG) device beyond the oxygen concentration of an alternative air supply stream, for example engine bleed air.

According to one embodiment, the present invention provides a method for providing regulated flow of oxygen, for a passenger on an aircraft. In accordance with the method, a first system is activated to initiate an initial flow of oxygen at high altitudes greater than 30,000 feet from a first on-board oxygen supplier. The first on-board oxygen supplier may be a pressurized oxygen cylinder, a chemical oxygen generator, or a combination of a pressurized oxygen cylinder and a chemical oxygen generator. A second system is also activated to initiate a subsequent flow of oxygen from a second on-board oxygen supplier. The second on-board oxygen supplier is a first on-board oxygen generator. The first on-board oxygen generator is configured to supply a first gas stream having an oxygen concentration of 99% or greater. The method further involves integrating oxygen supplied from the second system with oxygen supplied from the first system and deactivating the first system when the second system is able to meet oxygen supply requirements. The method also includes sensing the breathing pattern of a passenger and regulating flow of oxygen to a breathing mask of a passenger. Oxygen flow may be regulated by delivering oxygen to the mask from the first system or the second system through a pulsed oxygen delivery subsystem configured to vary a flow rate of oxygen based on a sensed breathing pattern and physiological requirements.

The present invention is not limited to the embodiments described above. Various changes and modifications can, of course, be made, without departing from the scope and spirit of the present invention. Additional advantages and modifications will readily occur to those skilled in the art. Accordingly, various modifications may be made without departing from the spirit or scope of the general inventive concept as defined by the appended claims and their equivalents.

What is claimed is:

1. A system for providing regulated flow of oxygen comprising:
   a first on-board oxygen supplier configured to supply oxygen in an initial stage, said first on-board oxygen supplier including a combination of a pressurized oxygen cylinder and a chemical oxygen generator, wherein said chemical oxygen generator comprises a plurality of igniters;
   a second on-board oxygen supplier configured to supply oxygen in a subsequent stage, said second on-board oxygen supplier includes a solid electrolyte oxygen separator configured to catalytically separate oxygen from a supply stream of air;

a pulsed oxygen delivery subsystem connected to the first on-board oxygen supplier and connected to the second on-board oxygen supplier; and a controller configured to control the first on-board oxygen supplier and the second on-board oxygen supplier, the controller directing oxygen from the first on-board oxygen supplier during the initial stage to the pulsed oxygen delivery subsystem, and then phasing out supply of oxygen from the first on-board oxygen supplier in the subsequent stage while directing the second on-board oxygen supplier to supply oxygen to the pulsed oxygen delivery subsystem.

2. The system of claim 1, wherein the first on-board oxygen supplier is configured to supply highly enriched oxygen at pressure suitable for breathing at high altitudes greater than 30,000 feet.

3. The system of claim 1, wherein the solid electrolyte oxygen separator comprises a ceramic material inside of which oxygen is catalytically separated from the supply stream of air.

4. The system of claim 1, further comprising a breathing mask in a communicating relationship with said pulsed oxygen delivery subsystem, whereby the breathing mask is configured to receive oxygen from said pulsed oxygen delivery subsystem supplied by at least one of the first on-board oxygen supplier and the second on-board oxygen supplier.

5. The system of claim 4, wherein said pulsed oxygen delivery subsystem is configured to regulate flow of oxygen to the breathing mask based on a sensed breathing pattern and physiological requirements.

6. The system of claim 1, wherein the controller is configured to initiate rapid flow of oxygen from the first on-board oxygen supplier at high altitudes greater than 30,000 feet.

7. The system for providing regulated flow of oxygen of claim 1, wherein said chemical oxygen generator comprises a plurality of sequencers.

8. A system for providing regulated flow of oxygen, including for flight crew or passengers on-board an aircraft, comprising:

a first on-board oxygen supplier configured to supply oxygen during an initial stage, said first on-board oxygen supplier including a combination of a pressurized oxygen cylinder and a chemical oxygen generator, wherein said chemical oxygen generator comprises a plurality of igniters;

a second on-board oxygen supplier configured to supply oxygen in a subsequent stage, said second on-board oxygen supplier includes a solid electrolyte oxygen separator configured to catalytically separate oxygen from a supply stream of air;

a pulsed oxygen delivery subsystem connected to the first on-board oxygen supplier and connected to the second on-board oxygen supplier;

a breathing mask in a communicating relationship with said pulsed oxygen delivery subsystem, whereby oxygen is supplied to a passenger or a flight crew member through the breathing mask from said pulsed oxygen delivery subsystem supplied by at least one of the first on-board oxygen supplier and the second on-board oxygen supplier;

a controller electrically connected to both the first on-board oxygen supplier and the second on-board oxygen supplier and configured to control the first on-board oxygen supplier and the second on-board oxygen supplier, the controller directing oxygen from the first on-board oxygen supplier during the initial stage to the pulsed oxygen delivery subsystem, and then phasing out supply of oxygen from the first on-board oxygen supplier in the subsequent stage while directing the second on-board oxygen supplier to supply oxygen to the pulsed oxygen delivery subsystem.

9. The system for providing regulated flow of oxygen of claim 8, wherein said chemical oxygen generator comprises a plurality of sequencers.

* * * * *